United States Patent [19]

Nunlist et al.

[11] 4,221,488
[45] Sep. 9, 1980

[54] SEPARABLE BLADE AGITATOR AND METHOD AND MEANS FOR ASSEMBLY

[75] Inventors: Erwin J. Nunlist, Penfield; Howard G. Coleman, Naples; Edward S. Harrison, Perinton, all of N.Y.

[73] Assignee: Sybron Corporation, Rochester, N.Y.

[21] Appl. No.: 17,828

[22] Filed: Mar. 5, 1979

[51] Int. Cl.³ .............................................. B01F 13/00
[52] U.S. Cl. .................................................... 366/343
[58] Field of Search ............... 366/343, 344, 349, 326, 366/143, 144, 147; 416/241 R

[56] References Cited

U.S. PATENT DOCUMENTS

| 1,955,728 | 4/1934 | Allen | 62/1 |
| 2,118,120 | 5/1938 | Spang | 366/147 |
| 2,839,143 | 6/1958 | Alexander | 166/46 |
| 2,850,340 | 9/1958 | Brill | 309/19 |
| 3,574,252 | 4/1971 | Rockoff | 29/148.4 |
| 3,724,059 | 4/1973 | Celousky | 29/426 |
| 3,731,367 | 5/1973 | Friedrich | 29/447 |
| 3,928,167 | 12/1975 | Buoy | 204/286 |
| 3,986,705 | 10/1976 | Nauta | 366/326 |
| 4,008,883 | 2/1977 | Zubleta | 366/343 |
| 4,017,959 | 4/1977 | Fletcher | 29/447 |

Primary Examiner—Edward J. McCarthy
Attorney, Agent, or Firm—Theodore B. Roessel; Roger Aceto

[57] ABSTRACT

A separable blade agitator has a glass coated drive shaft and a glass coated impeller interference fitted to the end of the shaft in a gasketless, glass surface to glass surface joint. The interference fitting of the impeller to the shaft is accomplished by super cooling the end of the shaft with nitrogen or the like so that it can be inserted into a glass coated bore in the impeller.

9 Claims, 6 Drawing Figures

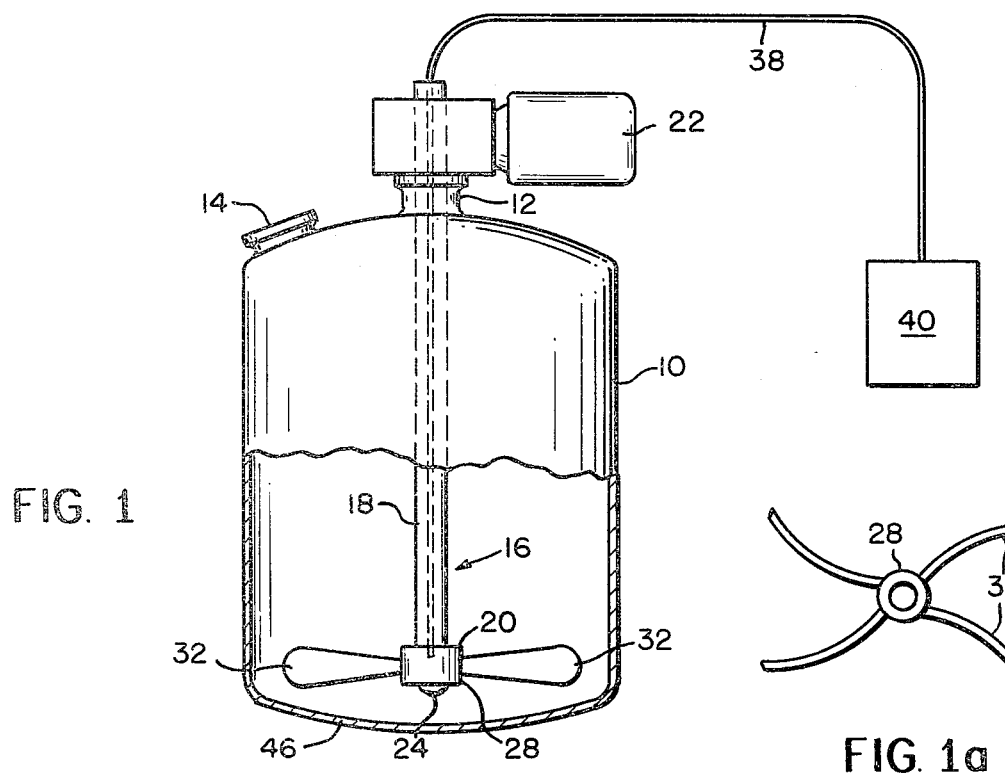
FIG. 1
FIG. 1a
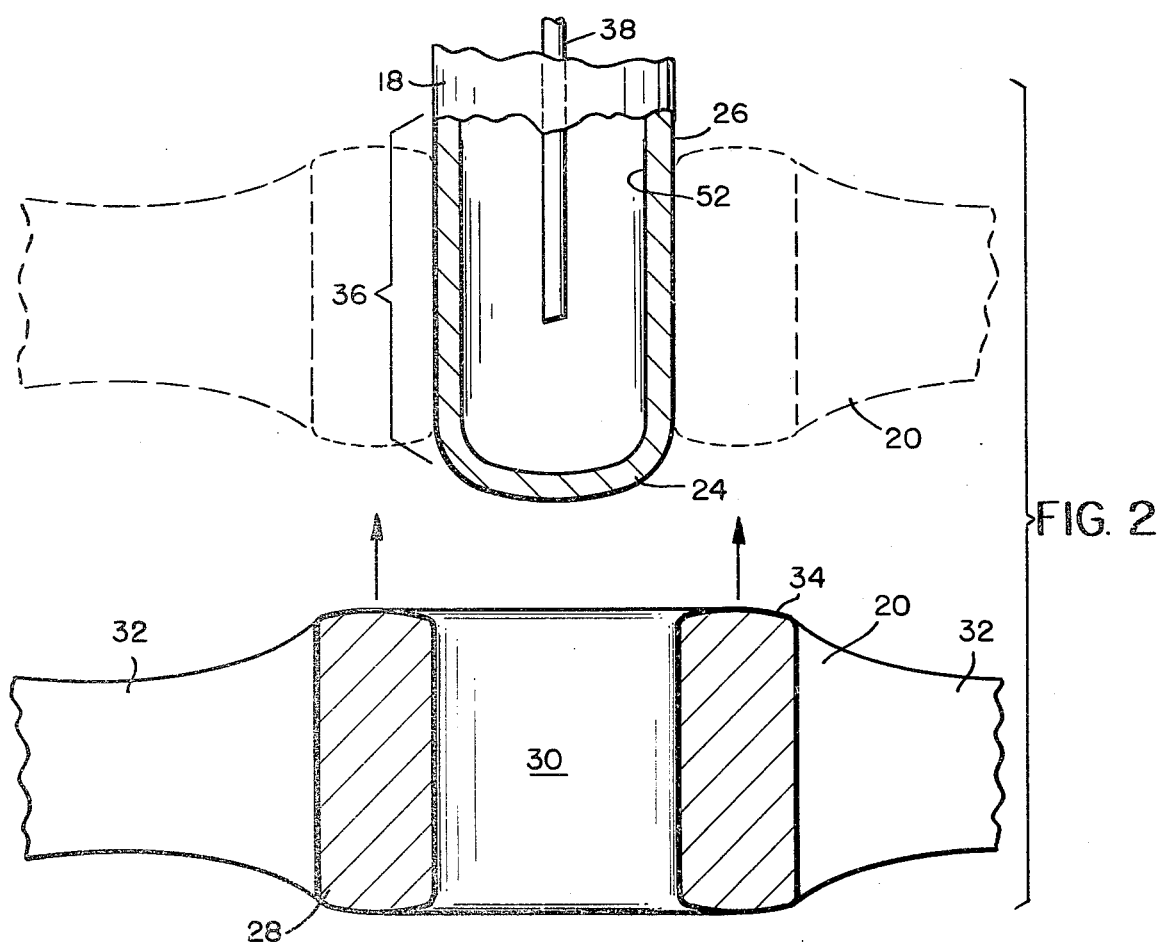
FIG. 2

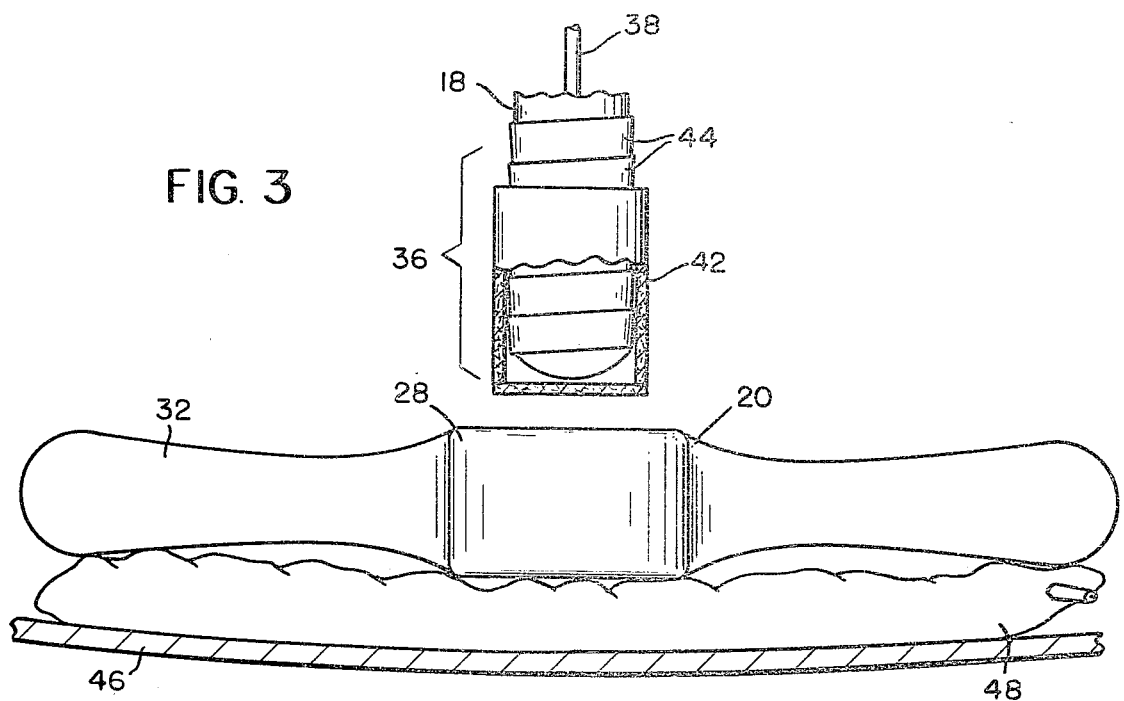
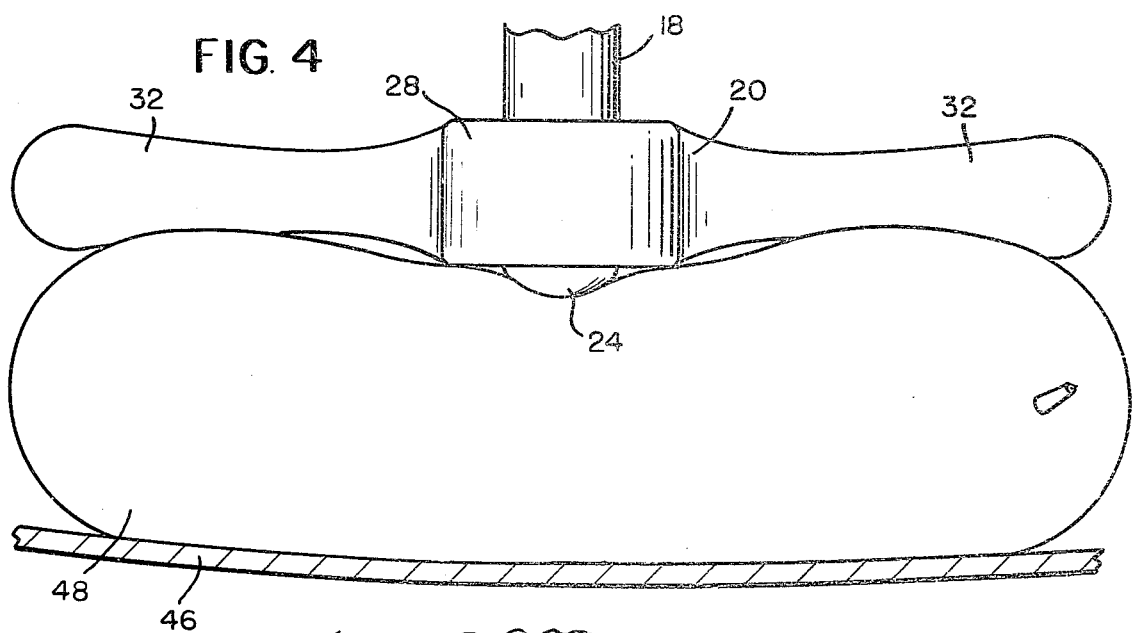
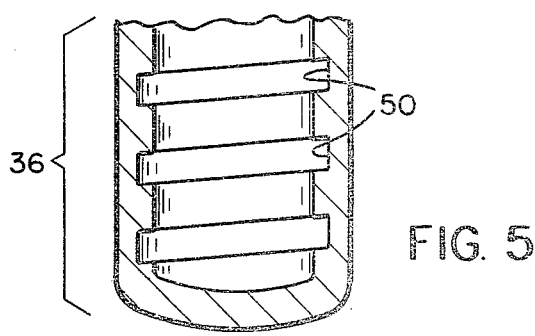

SEPARABLE BLADE AGITATOR AND METHOD AND MEANS FOR ASSEMBLY

BACKGROUND OF THE INVENTION

The present invention relates generally to separable blade agitators and more particularly to a glass coated agitator and the apparatus and method for assembling the agitator within a mixing vessel.

Separable blade agitators are well known in the art and are described for example in U.S. Pat. Nos. 2,811,339 and 3,494,708. Briefly, a separable blade agitator includes a drive shaft and a separable impeller. The impeller includes a hub for attachment to the drive shaft and two or more blades extending outwardly from the hub. The entire surface of the drive shaft, hub and blades exposed to the vessel contents is glass coated to resist corrosion, adherence and abrasion. Such separable blade agitators are used in vessels for mixing various corrosive, adhesive, abrasive or easily contaminated ingredients, such as acids, polymers, pharmaceuticals, dyes and the like.

These agitators especially have great value in closed vessels of this type because they eliminate the need for large vessel openings normally used for agitator removal and admittance. In this respect, the separable impeller portion can be passed into a pressure vessel through a relatively small manhole opening and assembled within the vessel to the drive shaft.

Separable blade agitators are useful in either closed or open vessels in that they permit replacement of damaged impellers or changing the size or type of impeller without the need to remove the entire agitator (i.e. drive shaft and impeller) from the vessel or to disconnect the drive shaft from the drive motor and seals.

The primary drawback of separable blade agitators of the prior art is that relatively complicated, expensive components are needed to hold the shaft and agitator portion together in a fluid tight, gasketless connection which is able to transmit torque through the connection from the drive shaft to the impeller blades.

While separable blade agitators having gasketed connections are known, any gasket used must be made from tantalum or other exotic metal or from a fluorocarbon in order to resist the highly corrosive environments to which these gaskets may be exposed. Another drawback with gaskets is that they take a set due to repeated heating and cooling and eventually leak. Normally leaking gaskets can be sealed by retightening but this is difficult to do in separable blade agitators and often the leakage is not noticed until the leakage into the shaft has caused damage.

The present invention completely eliminates the need for any gaskets or other assembly components and instead provides a separable blade agitator wherein the impeller is joined to the shaft in a glass-to-glass gasketless connection that is strong enough to transmit torque from the shaft to the agitator blade without the use of any key or spline connection. Thus, even if leakage does occur and corrosive liquids penetrate into the joint, no damage results because all surfaces coming in contact with the corrosive liquid are glass or enamel coated.

SUMMARY OF THE INVENTION

The separable blade agitator of the present invention includes a hollow shaft which is closed at one end, the exterior surface of the shaft being provided with a corrosion resistant coating, such as glass or enamel. The separable impeller includes a hub with a bore therethrough and blades extending outwardly from the hub, the entire surface of the separable impeller including the internal surface of the hub bore being provided with a corrosion resistant glass or enamel coating.

The inside diameter of the bore and the outside diameter of the shaft adapted to receive the impeller are each machined to provide an interference fit of between 0.00025 and 0.00075 inches per inch of diameter. The assembly of the interference fit is accomplished preferably by super cooling the end of the shaft to shrink its diameter so that it may be inserted into the hub bore. Ordinarily, one would believe that the glass coating on the shaft would pop off under the stress of such extreme cooling and size reduction. Unexpectedly we have found that such failure does not occur and that an interference fit of glass coated surfaces can be effected in this manner.

The apparatus for assembling the impeller to the shaft within the mixing vessel includes means for introducing a cooling medium, preferably liquid nitrogen or the like into the interior of the hollow shaft to super cool and shrink the shaft end. However, instead of simply super cooling the shaft, it is also possible to create the appropriate temperature differential by a combination of cooling the shaft and heating the impeller hub in order to both shrink the shaft and expand the hub by an amount sufficient to permit assembly or separation of the impeller and shaft. A lift means positioned between the bottom of the mixing vessel and the impeller is used to raise the impeller so that the cooled shaft end passes through the bore. The lift means thereafter supports the impeller at such elevated position until the temperature of the shaft and hub have equalized to provide the interference fit. This equalization of temperature is preferably accomplished by the warming of the super cooled shaft to ambient temperature. However, where the shaft is cooled and the hub is heated, the equalization of temperature will also involve a cooling of the hub.

DESCRIPTION OF THE DRAWINGS

FIG. 1 is a view in section of the mixing vessel showing the assembled agitator in place;

FIG. 1a shows a plan view of the impeller shown in FIG. 1.

FIG. 2 is a view on an enlarged scale showing a portion of the agitator drive shaft and separable impeller.

FIG. 3 is a view showing a portion of the bottom of the mixing vessel and the apparatus on which the separable impeller of the agitator rests prior to assembly;

FIG. 4 is a view similar to FIG. 2 showing the apparatus supporting the impeller in position for assembly to the agitator shaft; and FIG. 5 is a view on an enlarged scale showing a modified form of the lower end of the drive shaft.

DESCRIPTION OF THE PREFERRED EMBODIMENTS

Referring to the drawings, FIG. 1 shows a relatively large pressure vessel 10 of the type well known in the art. The vessel itself forms no part of the present invention and may be briefly described as a standard reactor used in the chemical industry for carrying out various reactions involving corrosive, adhesive, pharmaceutical and/or abrasive materials. Such a vessel ordinarily would be able to withstand relatively large internal pressures, have a capacity of several thousand gallons and would have its internal surface provided with a corrosion and abrasion resistant coating. To simplify the description the coating will be described herein as being "glass" but it should be understood that this term is to include any of the vitreous, partially devitrefied, ceramic or enamel coatings well known in the art as being applied to vessels, agitators and baffles. Such vessels would also have one or more openings at its top, including a drive opening 12 and a manhole 14.

Located within the vessel is the separable blade agitator of the present invention generally indicated at 16. The agitator includes a drive shaft 18 and a separable impeller 20, the impeller including a hub 28 and blades 32.

Where three or more blades 32 are needed, it may be desirable to provide more than one impeller each having a hub with one or more blades on the hub so as to facilitate passage of the impeller through the small manhole 14. Another solution would be to arrange the blades 32 in pairs at opposite sides of the hub as shown in FIG. 1a so that the impeller can be passed through a small manhole opening.

Agitator 16 has its drive shaft 18 extending up through drive opening 12 and connected to any suitable drive unit 22 for driving the shaft and impeller to mix the contents of the vessel. It should be appreciated that there is a suitable sealing means such as a stuffing box or rotary seal (not shown) between drive shaft 18 and vessel opening 12.

Manhole opening 14 preferably is kept as small as possible to facilitate handling and to reduce cost of manufacture. As a result, there is no vessel opening large enough to accommodate the passage of the assembled agitator 16. For this reason separable blade agitators are used wherein impeller 20 is passed separately into the pressure vessel through the manhole opening 14 and then assembled within the vessel to shaft 18. Separable blade agitators also have the advantage that the impeller 20 can be separated from shaft 18 and repaired or replaced without disassembling the entire drive 22 and removing the entire agitator 16 from the vessel.

Still referring to FIG. 1 it should be appreciated that the entire outer surface of drive shaft 18 and impeller 20, exposed to the contents of the vessel 10 is provided with a corrosion and abrasion resistant glass or enamel coating as is well known in the art.

Referring to FIG. 2, the lower end of drive shaft 18 and a part of impeller 20 is shown. Drive shaft 18 is hollow having a closed lower end 24. The upper end of the drive shaft (FIG. 1) which extends up through the top of the vessel and drive unit 22 is open for purposes set out hereinbelow.

The lower end 24 of the shaft is shown as having a rounded surface. This rounded surface permits the entire outer surface of the shaft exposed to the vessel environment including the lower shaft end 24, to be provided with a continuous corrosion, abrasion and adhesion resistant glass or enamel coating 26.

As set out above, impeller 20 includes a hub 28 and blades 32 which extend outwardly from the hub. Extending axially through the hub is a bore 30. The entire outer surface of the hub and blades including the surface of bore 30 is provided with a smooth, continuous, glass or enamel coating 34.

An important feature of the present invention is that the outer diameter of shaft 18 and in particular the lower portion as indicated at 36, and the diameter of hub bore 30 are sized to provide an interference fit of about 0.00025 to 0.00075 inches per inch of diameter. The accurate sizing of these two components may be accomplished by any suitable means such as by grinding, honing or lapping the glass coated shaft surface portion 36 and hub bore 30.

In order to provide for the interference fitting of impeller 20 to shaft 18 means are provided for cooling and shrinking the lower end portion 36 of the shaft so that it may fit into bore 30. While any suitable cooling medium can be used, such as brine, dry ice or a combination of dry ice with either acetone or ether, it is preferred that liquid nitrogen be used to super cool the end of the shaft.

The introduction of liquid nitrogen into the lower portion of the shaft can be accomplished by running a suitable conduit 38 from a source of liquid nitrogen 40 (FIG. 1) through the open top of the agitator shaft with the outlet end of conduit 38 terminating adjacent the bottom of the shaft (FIG. 2).

It should be appreciated that when the impeller 20 is assembled to the agitator drive shaft 18 as shown in dotted line in FIG. 2, the glass surface on bore 30 and the glass surface on drive shaft portion 28 provide a gasketless, glass surface-to-glass surface interference fitted connection rigidly affixing the impeller 20 to the end of the shaft. As compared to separable blade agitators of prior art, this completely eliminates the need for any special assembly or connecting components as shown in U.S. Pat. Nos. 2,811,339 and 3,494,708.

The apparatus used in assembling the impeller 20 to drive shaft 18 is illustrated in part in FIG. 3. In this respect the entire lower portion 36 of the shaft is first covered with a suitable wrapping 44, such as aluminum foil, a polystyrene film or the like. The purpose of the wrapping is to prevent the buildup of frost directly on the surface of the lower portion of the shaft as it is cooled. Any frost which does build up is later quickly and easily removed when the wrapping is removed. If desired, a heat insulator 42 such as cardboard or asbestos can be placed around the end of the shaft over the wrapper to speed the cool down of the shaft.

Next, liquid nitrogen from source 40 is allowed to flow through conduit 38 and into the lower portion of the shaft. The liquid nitrogen extracts considerable heat from the shaft and as a consequence shaft end 36 is super cooled and the diameter shrinks. As previously mentioned the presence of wrap 44 on the exterior of shaft portion 36 is necessary to prevent the build up frost on the exterior of the shaft. In this regard, if frost is allowed to build up directly on the shaft, the effective diameter of the shaft is increased by the layer of this frost so that it may be impossible to insert this frosted shaft into the bore 30.

After the diameter of shaft portion 36 is sufficiently cooled and shrunk, the insulation and wrap are removed which also removes any frost build up. The impeller 20 is then aligned with the shaft and lifted to fit the end of the shaft into bore 30. The impeller is simply supported for a few minutes in this position to allow the shaft to warm and equalize in temperature with the hub so as to effect the interference fit.

Another feature of the present invention is the manner in which the agitator portion 20 is raised and held in the mating position with shaft 18. In this respect, FIG. 1 shows that the impeller preferably is located very close to the bottom 46 of pressure vessel 12. With the agitator in this position, agitation can be provided both for small batch mixing and while the contents of the vessel are being drained. Accordingly, there is very little room in the optimum situation between the lower end 24 of shaft 18 and vessel bottom 46. A further hindrance in the raising of separable impeller 20 is that all surfaces within the pressure vessel including the vessel bottom 46, impeller blades 32 and shaft 18 are glass coated so that great care needs to be taken when manipulating the separable agitator to insure that none of these glass surfaces are damaged.

Furthermore, due to the close fit between shaft end 24 and bore 30, the shaft and bore should be accurately aligned and the impeller wiggled in order to permit the shaft to pass into the bore. The impeller is a relatively heavy item, so means must be provided to permit such adjustment as well as prevent any damage to any of the glass surfaces. Lifting and supporting the impeller can be done manually or with any suitable hydraulic or pneumatic lifting means. However, it has been found that a simple inner tube or other inflatable bladder member 48 works most effectively for supporting, raising and positioning the impeller 20 on assembly and for catching and lowering the impeller on disassembly.

To assemble impeller 20 to the shaft, the deflated and collapsed bladder member 48 is placed on the bottom of the pressure vessel as shown in FIG. 3. The completely collapsed nature of the bladder allows it to fit easily between the bottom of the vessel and the end of the shaft. Impeller 20 is then passed into the vessel through manhole opening 14 and laid upon this bladder. The end of shaft 18 is then wrapped with a suitable wrap 44 and covered with insulation 42. Liquid nitrogen is introduced into the shaft through tube 38 as set out hereinabove.

After the liquid nitrogen has super cooled and shrunk the diameter of shaft portion 36, the flow of liquid nitrogen is terminated, the insulation is removed and the wrap stripped from the exterior of the shaft. This leaves the shaft end clean and frost free. Bladder 48 is then inflated by any suitable means, such as a hand pump, portable air cylinder or the like (not shown) to lift impeller 20 towards the end 24 of the shaft. As the bladder is being inflated, the impeller can be adjusted on the bladder to align the shaft to the bore opening without damaging the glass surface on either the impeller blades 32 or the pressure vessel. As hub 28 moves over the end of shaft 18 the entire impeller can be jockeyed or otherwise manipulated on the bladder as necessary to move the hub over the end of the shaft.

Once the end of shaft 18 is fully introduced into bore 30, (FIG. 4) the inflated bladder will act as a support to hold the impeller in position while the shaft end warms to ambient temperature to effect the interference fit. After a suitable time interval, bladder 48 is merely deflated and removed from the vessel leaving the impeller firmly attached to the end of the shaft.

If the impeller becomes damaged in use or if a different shape impeller is desired or when it becomes necessary to remove impeller 20 for what ever reason, the reverse procedure takes place. In this respect, bladder 48 is inflated and thereafter, liquid nitrogen is introduced into the shaft to shrink the shaft and free shaft end 24 from bore 30. This drops the impeller on to the bladder which is then deflated to fully disengage and lower the separable impeller from the shaft.

As soon as possible after removal of the impeller, shaft portion 36 must be wrapped as shown at 44 in FIG. 3. Otherwise, frost will immediately begin building upon the shaft and by the time the old impeller is moved out of the way and a new impeller raised to the level of the shaft, the frost build up on the shaft may be large enough to prevent fitting a new impeller on the shaft.

After the old impeller is removed and a new impeller is placed on bladder 48, the wrap is removed and the bladder inflated to assemble the new impeller to the shaft as set out hereinabove.

It has been found that disassembly creates a greater problem than assembly. In this respect, even with the use of liquid nitrogen that is capable of cooling the agitator shaft to below minus 200° F., a shaft with a relatively heavy wall will take too much time to cool. By the time the shaft is sufficiently cooled, hub 28 has also started to cool down and shrink, so that a difference of temperature is never reached sufficient to permit disassembly. It is possible to provide external heat to the hub, such as by an electric heating tape or steam, but for various reasons the application of external heat directly to the glass coated hub is not a preferred method to use inside of a closed pressure vessel. It is also possible to heat the entire vessel by running steam or heated water through an exterior jacket and then allowing the drive shaft and impeller to soak in the heated vessel for several hours before introducing the cooling medium into the shaft. However, this is not a preferred solution because of the time involved.

To provide a suitable interference fit capable of transmitting the required torque and at the same time permitting a fast cooling rate for disassembly, it has been found that certain design parameters are critical to observe. For example, it has been found that an interference of between 0.00025 and 0.00075 inches per inch of diameter is suitable for these purposes. With a standard shaft diameter of 3¼ inches, an interference fit of between 0.0016 and 0.0024 inches is produced. With a hub length of 4 inches it was found that this interference not only permitted disassembly with use of liquid nitrogen alone, but also allowed the shaft to transmit over 100,000 inch pounds of torque to the impeller hub before slipping. If more torque is desired, it is possible to increase the surface area of the interference fit by increasing the length of the impeller hub or by increasing the diameter of the shaft and bore.

It is also possible to increase the internal surface area of shaft 18 adjacent end portion 36 to speed heat transfer. This can be accomplished, for example, as shown in FIG. 5 by machining internal grooves 50 in the shaft wall. Such grooves can be made, for example, by cutting a spline or a spiral or by cutting an Acme thread or the like on the internal surface of the shaft.

Yet another way of speeding heat transfer to more quickly cool and shrink the shaft is to line the internal surface of the lower shaft portion with an insulating material 52 such as polytetrafluroethylene (FIG. 2). It has been found that such insulation increases the cooling rate of the shaft. It is believed that the faster cooling rate is achieved because the insulation prevents the formation of a vapor layer at the liquid nitrogen-shaft surface interface and allows the nitrogen to wet and cool the surface.

Thus, it should be appreciated that the present invention provides a separable blade agitator which has virtually no mechanical parts such as threaded hubs, bolts or draw bars to hold the separable impeller and drive shaft together. Furthermore, the method and apparatus of the present invention permits the impeller to be assembled to or removed from the drive shaft without any relocation or adjustment of the shaft itself. This allows assembly or disassembly to be made without interfering with the seal means between the drive shaft and the pressure vessel or affecting in any way the connection between the drive unit and the shaft. Thus, the assembly or disassembly can be made within a vessel quickly and easily without changing the position of the drive shaft. While the invention has been described in connection with a closed pressure vessel, it should be appreciated that the separable blade agitator as described herein could be used in any open mixing vessel as well.

The method and apparatus of the present invention can be accomplished at minimum risk to the glass coating of the vessel interior or the glass coating on the shaft and impeller as no metal tools such as wrenches or the like need to be brought into the vessel to assemble or disassemble the agitator. Also, by supporting the impeller blades on an inflatable bladder, a firm, but impact free support is provided for the impeller blades. Further this bladder is disposed between the base of the pressure vessel and the impeller blades 32 so there is little or no risk of the impeller dropping or impacting against the glass covered bottom of the vessel to damage the glass coating on either the impeller or the vessel.

Having the thus described the invention, what is claimed as new is:

1. A separable blade agitator comprising:
   (a) a hollow metal shaft having a closed end;
   (b) a corrosion resistant glass coating on the external surface of said shaft and over said closed end;
   (c) a metal impeller fixed to said shaft adjacent said closed end, said impeller having a hub and at least one impeller blade extending outwardly from said hub, said hub having a bore therethrough;
   (d) a corrosion resistant glass coating over the entire surface of said impeller including the surface defining the I.D. of said bore; and
   (e) said shaft closed end extending through said bore in a gasketless, glass-to-glass interference fitted connection.

2. A separable blade agitator as in claim 1 wherein the O.D. of said shaft adjacent said closed end and the I.D. of said bore are sized to provide an interference fit of about 0.00025 to 0.00075 inches per inch of diameter.

3. A separable blade agitator as in claim 1 wherein said hollow shaft is adapted to receive therein a cooling fluid to cool and shrink the O.D. at said closed end.

4. A separable blade agitator as in claim 1 wherein said hollow shaft has its internal surface adjacent said closed end provided with grooves to increase the relative internal surface area of said shaft adjacent said closed end.

5. A separable blade agitator as in claim 1 including an insulating means lining the internal surface of said hollow shaft adjacent said closed end.

6. In a separable blade agitator including a glass coated shaft and a glass coated impeller carried on one end of the shaft, the improvement comprising:
   (a) said impeller having a bore therethrough, the glass coating on said impeller extending over the internal surface defining said bore; and
   (b) said one end extending through said bore and being fixed therein by a gasketless, interference fitted engagement of said glass coated bore surface and said glass coated shaft surface.

7. A separable blade agitator as in claim 6 wherein the O.D. of said shaft at said one end is greater than the I.D. of said bore, said shaft being hollow and said one end being closed for receiving therein a cooling fluid to cool and shrink the O.D. of said one end sufficient to permit insertion of said one end into said bore.

8. A separable blade agitator as in claim 7 wherein the O.D. of said one end and the I.D. of said bore are sized to provide an interference fit of about 0.00025 to 0.00075 inches per inch of diameter.

9. A separable blade agitator comprising:
   (a) a hollow shaft having a closed end adapted to receive a cooling fluid therein to cool and shrink the O.D. of said shaft adjacent said closed end, the external surface of said shaft being provided with a smooth, continuous and unbroken glass coating which extends over said closed end;
   (b) an impeller having a hub and at least one blade extending outwardly from said hub, said hub having a bore therethrough for receiving the closed end of said shaft, the entire surface of said impeller including the surface defining said bore being provided with a smooth, continuous and unbroken glass coating; and
   (c) the O.D. of said shaft adjacent said closed end and the I.D. of said bore being sized to provide an interference fit of between 0.00025 and 0.00075 inches per inch of diameter, the O.D. of said shaft end being sufficiently decreased by the introduction of a cooling fluid therein to provide for the insertion of said closed end through said bore, whereby said impeller is connected to said closed end by a gasketless, interference fitted, glass surface-to-glass surface connection.

* * * * *

REEXAMINATION CERTIFICATE (251st)
United States Patent [19]
Nunlist et al.

[11] B1 4,221,488
[45] Certificate Issued Sep. 18, 1984

[54] SEPARABLE BLADE AGITATOR AND METHOD AND MEANS FOR ASSEMBLY

[75] Inventors: Erwin J. Nunlist, Penfield; Howard G. Coleman, Naples; Edward S. Harrison, Perinton, all of N.Y.

[73] Assignee: Kennecott Corp., Cleveland, Ohio

Reexamination Request:
No. 90/000,425, Jul. 25, 1983

Reexamination Certificate for:
Patent No.: 4,221,488
Issued: Sep. 9, 1980
Appl. No.: 17,828
Filed: Mar. 5, 1979

[51] Int. Cl.$^3$ .............................................. B01F 13/00
[52] U.S. Cl. ................................................... 366/343
[58] Field of Search .............. 366/279, 343, 344, 349, 366/326, 143, 144, 147; 416/241 R

[56] References Cited
U.S. PATENT DOCUMENTS

| | | | |
|---|---|---|---|
| 1,528,329 | 3/1925 | Hastings | 366/279 |
| 2,267,339 | 12/1941 | Paulsen . | |
| 2,348,696 | 5/1944 | Schabacker . | |
| 2,401,231 | 5/1946 | Crawford . | |
| 2,811,339 | 10/1957 | Osborne et al. . | |
| 3,215,410 | 11/1965 | McMaster et al. | 366/343 |
| 3,494,708 | 2/1970 | Nunlist et al. . | |
| 3,559,274 | 2/1971 | Granata . | |
| 3,733,645 | 5/1973 | Seiler | 366/343 X |
| 3,967,360 | 7/1976 | Nolte . | |

OTHER PUBLICATIONS

*Machinery's Handbook*, 19th Edition, Industrial Press, pp. 1506–1531, Erik Oberg and Franklin D. Jones, 1973.

*Primary Examiner*—Timothy F. Simone

[57] ABSTRACT

A separable blade agitator has a glass coated drive shaft and a glass coated impeller interference fitted to the end of the shaft in a gasketless, glass surface to glass surface joint. The interference fitting of the impeller to the shaft is accomplished by super cooling the end of the shaft with nitrogen or the like so that it can be inserted into a glass coated bore in the impeller.

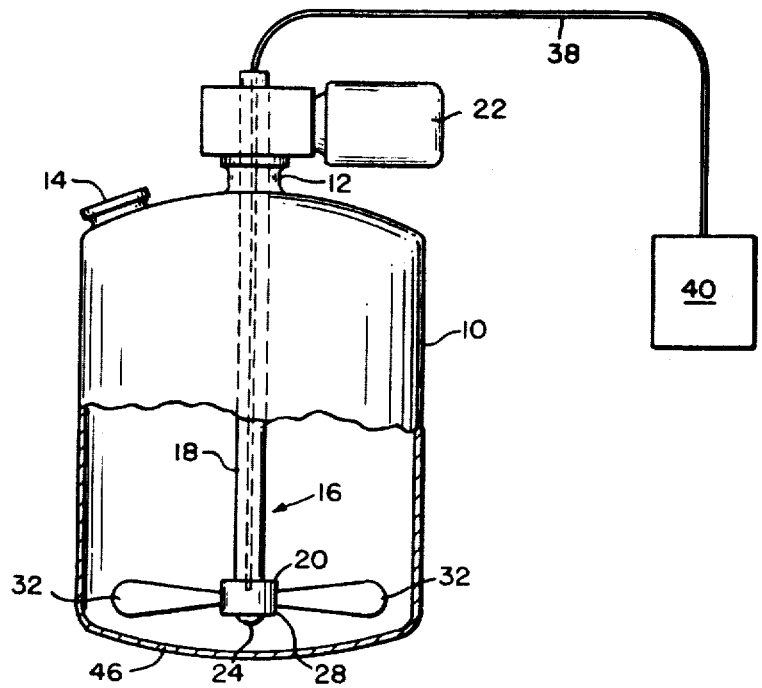

REEXAMINATION CERTIFICATE ISSUED UNDER 35 U.S.C. 307.

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *